Figure 1:
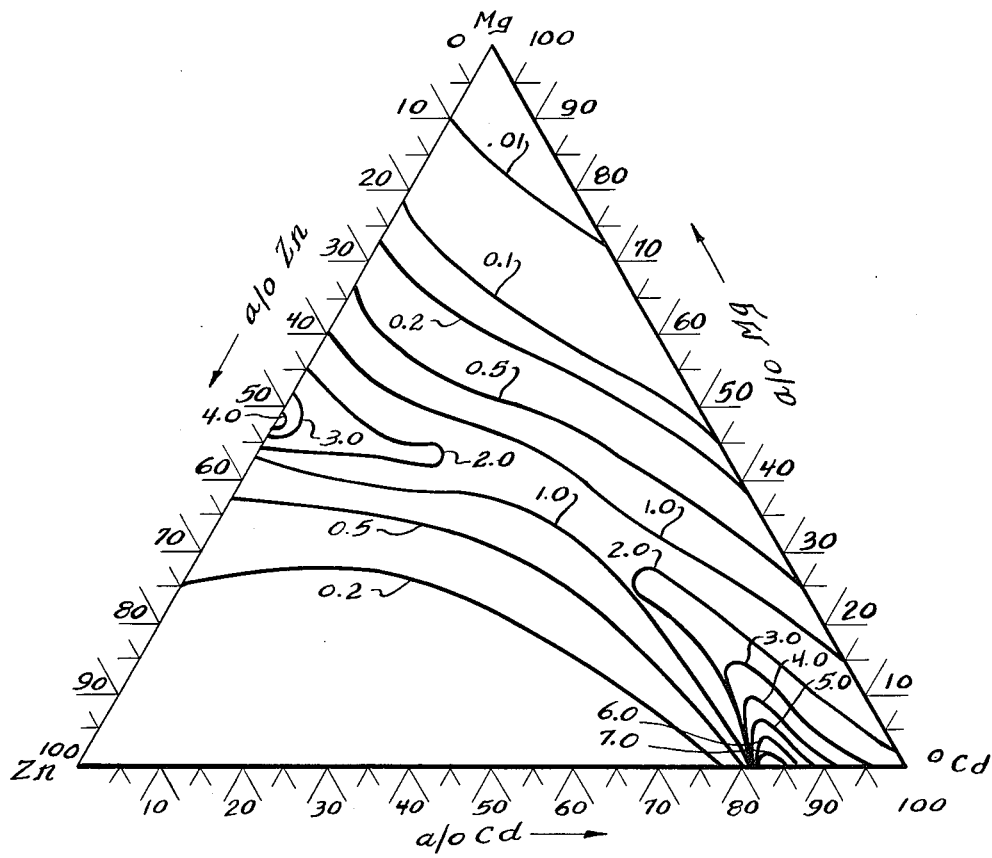

Nov. 16, 1965  J. B. KNIGHTON ET AL  3,218,160
REGENERATION OF NUCLEAR FUEL
Filed Nov. 10, 1964   4 Sheets-Sheet 1

Solubility of Uranium (Weight Per Cent) in Cd-Mg-Zn at 600°C.

INVENTORS
James B. Knighton
Harold M. Feder
Robert K. Steunenberg
Attorney

Distribution Coefficients of Praseodymium $\left(\dfrac{w/o \text{ in salt}}{w/o \text{ in metal}}\right)$ at 600° C.

INVENTORS
James B. Knighton
Harold M. Feder
Robert K. Steunenberg

Attorney

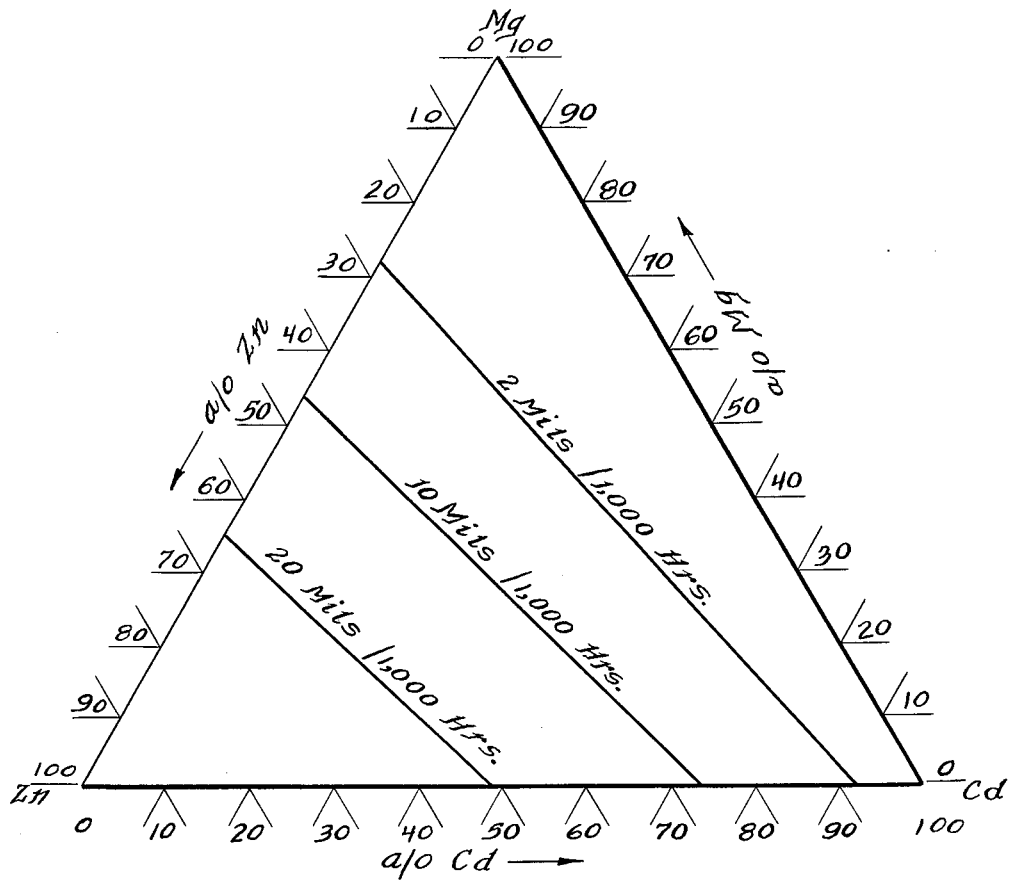
Corrosion of 405 Stainless Steel at 750°C

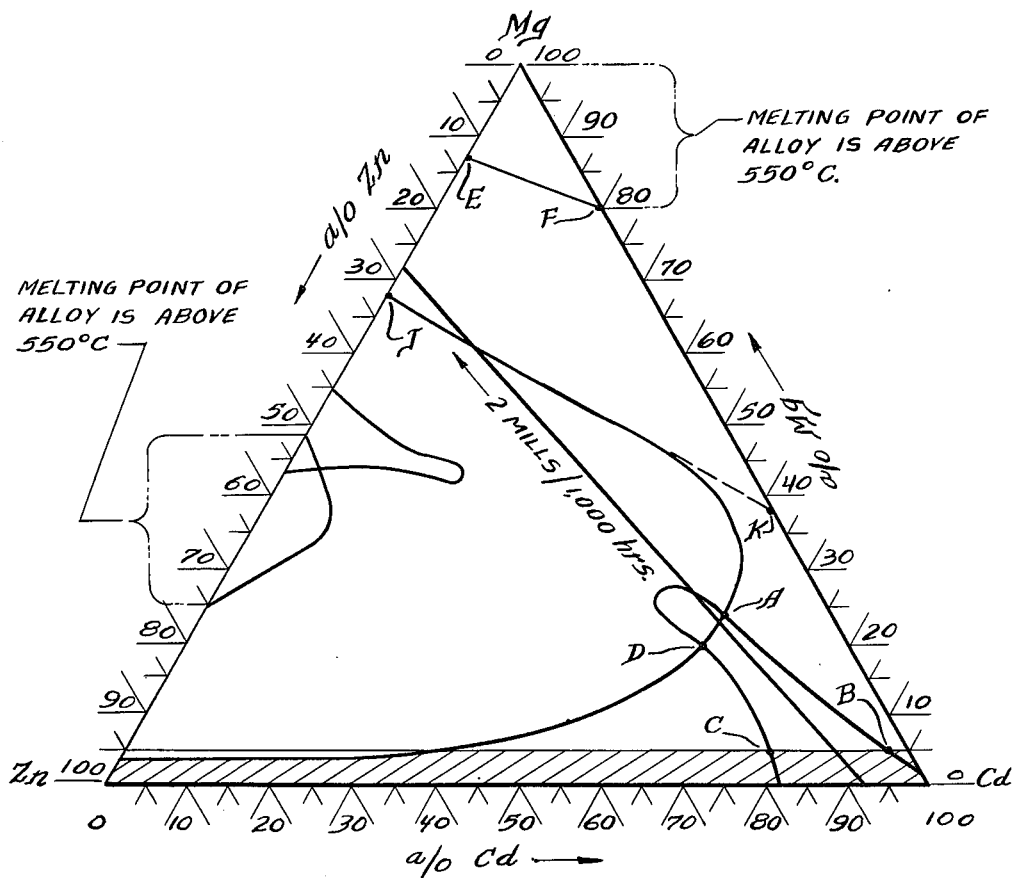

United States Patent Office 3,218,160
Patented Nov. 16, 1965

3,218,160
REGENERATION OF NUCLEAR FUEL
James B. Knighton, Joliet, Harold M. Feder, Park Forest, and Robert K. Steunenberg, Naperville, Ill., assignors to the United States of America as represented by the United States Atomic Energy Commission
Filed Nov. 10, 1964, Ser. No. 410,333
4 Claims. (Cl. 75—84.1)

The invention described herein was made in the course of, or under, a contract with the U.S. Atomic Energy Commission.

This application relates to a process of regenerating neutron-bombarded metallic uranium-base fuel that also contains plutonium and fission-product values; more particularly it deals with the removal of lanthanide rare earths, yttrium, alkali metals and alkaline earth metals present as fission products from uranium and plutonium.

Separation processes have been carried out heretofore for the purpose just described, for instance, by introducing the fuel into molten magnesium chloride in the presence of a molten zinc-magnesium alloy, whereby the actinides were reduced to the metal and dissolved by the alloy, while the fission products stayed in the salt phase as the chlorides; a phase separation then brought about the desired decontamination of the fuel. This process is the subject matter of the assignee's copending application S.N. 233,-984, filed on October 29,1962, by the inventors of this application, James B. Knighton and Robert K. Steunenberg, now Patent No. 3,169,057, issued on February 9, 1965.

While the process of the copending application yields a satisfactory separation, it has the drawback that it requires temperatures as high as about 800° C., so that expensive corrosion-resistant tantalum or tungsten equipment is required.

It is the prime object of this invention to provide a process which can be carried out at comparatively low temperatures and for which crucibles and other equipment of nickel-free stainless steel or similar inexpensive corrosion-resistant materials can be used instead of the expensive tantalum or tungsten.

A great many studies were carried out to determine the most favorable conditions from the above aspect, conditions that achieved maximum uranium and plutonium solubility in the alloy, maximum distribution of the lanthanide rare earths into the salt phase and thus maximum decontamination of the actinides from the fission products and a minimum of corrosion of the container material by the alloy at the operating temperatures.

Figure 2:
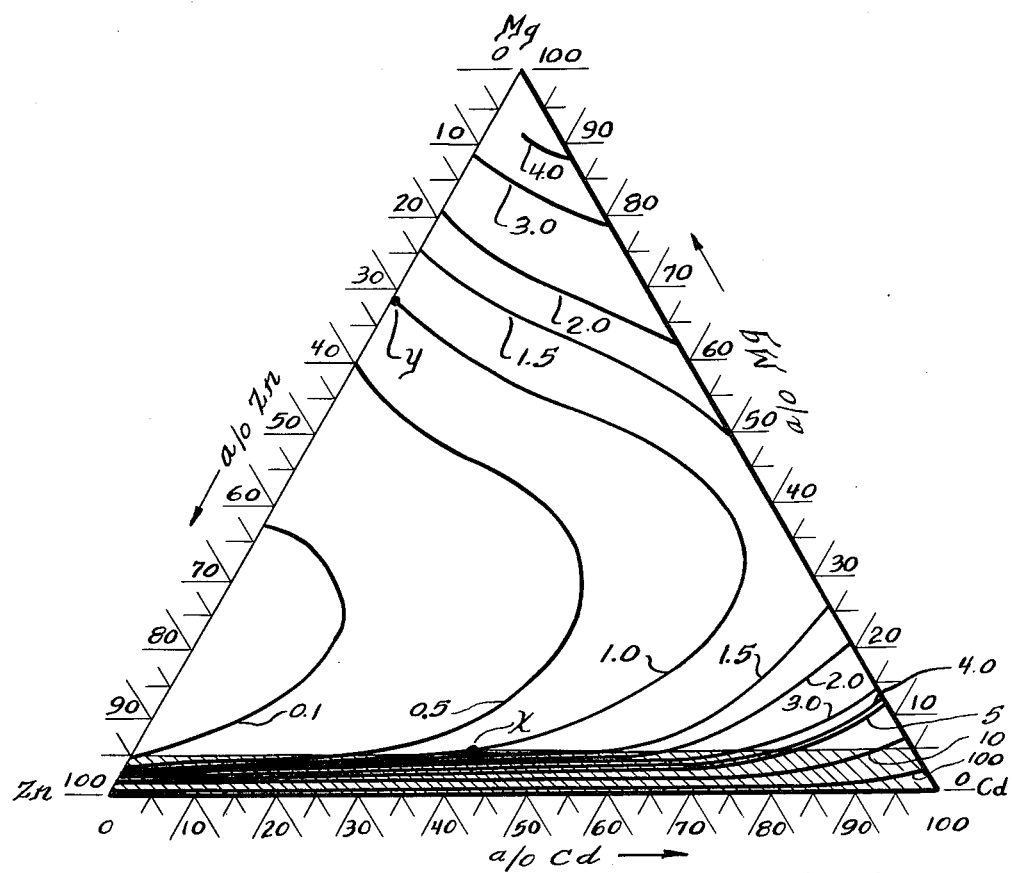

Various diagrams were plotted from the results of these studies. These diagrams are shown in the accompanying drawings wherein:

FIG. 1 shows a number of curves each connecting points of equal solubility for uranium in cadmium-magnesium-zinc alloys of varying compositions at 600° C.;

FIG. 2 contains curves of equal distribution coefficients (weight percent of Pr in salt: weight percent of Pr in alloy) which were determined at 600° C. with praseodymium as the representative of lanthanide rare earths, because it is the one that is the most difficult to separate from plutonium. The salt was a mixture of 30 mole percent NaCl, 20 mole percent KCl and 50 mole percent MgCl₂, and the composition of the cadmium-magnesium-zinc alloy was varied;

FIG. 3 shows curves of equal corrosion at 750° C. which were determined by others with various cadmium-magnesium-zinc alloys in stainless steel containers (SS Type 405).

FIG. 4 summarizes the optimum conditions shown in the three diagrams of FIGS. 1–3 for easy determination of the critical operating conditions.

For the studies that led to this invention, the salt phase was always that used in FIG. 2, namely a mixture of 30 mole percent of sodium chloride, 20 mole percent of potassium chloride and 50 mole percent of magnesium chloride, the temperature always 600° C. except for the corrosion tests; the composition of the cadmium-magnesium-zinc alloy was the variable.

In order to obtain a satisfactory separation of the rare earths and other fission products from uranium and plutonium generally, and of the praseodymium from plutonium particularly, more than half of the praseodymium and less than half of the plutonium should enter the salt phase. In other words, referring to FIG. 2 (based on equal weights of alloy and salt), for satisfactory praseodymium distribution into the salt phase, an alloy composition should be used that is within the area to the right of curve X–Y, which represents the distribution coefficient of 1.0. Furthermore, in order to obtain both maximum uranium solubility in the alloy and maximum rare earth distribution to the salt, the alloy composition should be restricted to the area defined in FIG. 4 by points A, B, C, D.

To repeat, this area A–B–C–D thus determines the alloys with which both a maximum uranium solubility and the desired distribution of lanthanide rare earth and of uranium plus plutonium are accomplished. This area also coincides with compositions of low stainless steel corrosion, as is obvious from FIG. 3. The corrosion value of said minimum-corrosion curve is 2 mils per 1000 hours at 750° C., which means that it would be even less than that at 600° C. This critical area A–B–C–D indicates an alloy consisting of from 83 to 97 atom percent of cadmium, from 5 to 24 atom percent of magnesium and from 3 to 18 atom percent of zinc.

While FIG. 1 makes it appear desirable to use a magnesium-free or magnesium-poor alloy, because then the highest uranium solubility of up to 7 weight percent was obtained, these low ranges (crosshatched in FIG. 4) were found not to be advantageous. At these very low magnesium concentrations, plutonium is also extracted into the salt to a considerable degree which is most undesirable, because it would defeat the purpose of the process. Furthermore, the extraction system is extremely sensitive to changes of the magnesium concentrations at these low magnesium values. For this reason, the area cross-hatched at the bottom of FIGS. 2, 3 and 4 is considered nonoperative.

The process of this invention thus comprises introducing the nuclear fuel to be processed into a molten salt mixture of 50 mole percent of magnesium chloride, 30 mole percent of potassium chloride and 20 mole percent of sodium chloride and of molten zinc-magnesium-cadmium alloy consisting of from 83 to 97 atom percent of cadmium, from 5 to 24 atom percent of magnesium and from 3 to 18 atom percent of zinc; and separating an alloy phase containing uranium and plutonium values from a salt phase containing fission-product values.

If the fuel to be processed is coated, clad or jacketed with a corrosion-protective metal, such envelopes are removed prior to processing proper. This can be done either by chemical or mechanical means, as is known to those skilled in the art.

A critical requirement of the chloride mixture is that it contain about 50 mole percent of magnesium chloride. The remainder of the composition can consist of sodium chloride, potassium chloride, lithium chloride, calcium chloride or any mixture thereof. The salt used for the studies that led to this invention, as has been set forth in the beginning of this application, was a salt containing 50 mole percent of magnesium chloride, 30 mole percent of sodium chloride and 20 mole percent of potassium chloride; it had a melting point of 396° C.

The alloy as well as the chloride mixture must be used in quantities that are sufficient for reaction and for the subsequent formation of alloy and flux phases, respectively. Thus, the alloy quantity should be adequate to reduce any uranium chloride and plutonium chloride that might have formed by reaction with the chloride mixture, and there also must be a sufficiently great excess of it to permit dissolution of the uranium and plutonium metals in it. Likewise, the flux quantity should be enough to chlorinate all fission products and to dissolve the chlorides thus formed. The operating temperature should be about 50° C. higher than the melting point of the salt or the alloy, whichever is higher. Nickel-free stainless steel containers and equipment were used in carrying out the separation process.

The reaction mass was stirred for thorough contact of the phases. After an agitation of approximately 30 minutes, the molten phases were separated by decanting; other known separation methods would also be suitable.

Instead of decontaminating uranium and plutonium together from the fission products, the process can be modified so that uranium is simultaneously separated from the plutonium. This is accomplished by operating in the precipitation area of the zinc-cadmium-magnesium alloy (FIG. 4). The area defined by points A–B–K–100% Mg–J is the area in which metallic uranium precipitates. Within this area the lower part only is desirable, because above line E–F the melting point of the alloy is undesirably high, namely above 550° C., which would require an operating temperature of 600° C.; this is clearly obvious from the curves of FIG. 4. Thus, the area defined by K–F–E–J is the desirable area for the precipitation of uranium metal, which covers alloys containing from 0 to 32 atom percent of zinc, 0 to 63 atom percent of cadmium and 37 to 87 atom percent of magnesium.

As a whole, the precipitation modification step is carried out analogously to the above-described separation process in which the uranium and plutonium are coextracted into the alloy. The only difference is that most uranium is not dissolved in the alloy and that it is removed from the plutonium-containing alloy by customary means, such as filtration or decantation. The precipitated uranium is then subjected to a distillation process, preferably in a vacuum, whereby the zinc and/or cadmium and the magnesium adhering thereto are volatilized and pure metallic uranium remains as a residue. The precipitation embodiment is preferred to the above-described coseparation process, because it accomplishes at the same time the decontamination from fission products and the separation of the uranium from the plutonium and also because excess solvent alloy is necessary only for dissolution of the small quantity of plutonium present.

It will be obvious to those skilled in the art that a repetition of the steps of the processes of this invention will bring about an improved decontamination and products of higher purity.

While this process has been described for the processing of metallic fuel, it is also applicable to carbide or oxide fuel materials. In these cases the carbide or oxide must be converted to the metal or chloride by pretreatment processes known to those skilled in the art.

In the following, an example is given for illustrative purposes which shows the process of this invention in which an alloy is used that accomplishes dissolution of the uranium metal.

*Example I*

5.7 grams of neutron-bombarded uranium metal containing 8.4 grams of plutonium and 0.9 gram of rare-earth fission products is dissolved in a molten alloy consisting of 11.2 grams of magnesium, 22.3 grams of zinc and 167 grams of cadmium at about 600° C. This solution is introduced in the center of a stainless steel extraction column into the bottom of which 200 grams of a molten chloride mixture containing 50 mole percent of magnesium chloride, 30 mole percent of sodium chloride and 20 mole percent of potassium chloride are fed, so that both salt mixture and alloy solution flow countercurrently. For scrubbing purposes another 8 grams of the alloy are introduced at the top of the column. A product alloy is withdrawn at the bottom of the column which contains 4.7 grams of uranium, 0.38 gram of plutonium and 0.2 gram of rare earths dissolved in 11.6 grams of magnesium, 23.2 grams of zinc and 173.7 grams of cadmium. The salt, after contact, is withdrawn at the top of the column; it contains, apart from 118.8 grams of magnesium chloride, 37.2 grams of potassium chloride and 43.9 grams of sodium chloride, 0.007 gram of uranium chloride, 0.01 gram of plutonium chloride and 0.14 gram of rare earth chlorides.

The product alloy is vacuum-heated in a beryllia crucible, whereby zinc, magnesium and cadmium are volatilized. After this, the product contains 4.74 grams of uranium, 0.83 gram of plutonium and only 0.019 gram of rare-earth fission products.

The next example illustrates a batch countercurrent operation for the separation of the uranium in the form of a precipitate.

*Example II*

A quantity of 5.7 grams of neutron-bombarded uranium is introduced in 75.6 grams of a molten alloy containing 80 atom percent of magnesium and 20 atom percent of cadmium. This mass is placed into a stainless steel container and mixed there with 38 grams of a salt mixture that has the same composition as that used in Example I. The temperature was 600° C. This feed extraction forms the center of a five-stage system, two of the other stages serving as salt-scrubbing stages and the remaining two as metal-extracting stages.

The salt from the feed extraction stage is separated from the alloy, and both are subjected to further processing in the remaining four stages.

The salt and alloy quantities originally introduced are the same in all stages. However, the magnesium chloride and magnesium concentrations change somewhat due to chlorination, reduction and oxidation reactions that take place in equilibrium with the alloy and the components of the fuel.

After the five stages described, 131.5 grams of an alloy are obtained that contain 47.5 grams of uranium, 8.4 grams of plutonium and 0.04 gram of rare earth. The bulk of the uranium is present in precipitated form and is separated by decantation. The salt derived from the last scrubbing stage contains 0.85 gram of rare earth, less than 0.03 gram of plutonium and negligible amounts of uranium. These data show that a good pyrometallurgical separation is obtained also by this modification.

It will be understood that the invention is not to be limited to the details given herein but that it may be modified within the scope of the appended claims.

What is claimed is:

1. A process of regenerating neutron-bombarded metallic uranium fuel containing plutonium and fission products, comprising introducing said fuel into a mixture of molten salt containing 50 mole percent of magnesium chloride, 30 mole percent of potassium chloride and 20 mole percent of sodium chloride with a molten cadmium-magnesium-zinc alloy consisting of from 83 to 97 atom percent of cadmium, from 5 to 24 atom percent of magnesium and from 3 to 18 atom percent of zinc at a temperature of about 600° C.; separating an alloy phase containing uranium and plutonium metals from a salt phase containing fission-product values; and heating said alloy phase for volatilization of cadmium, zinc and magnesium away from uranium and plutonium.

2. The process of claim 1 wherein the alloy consists of 15 atom percent of magnesium, 15 atom percent of zinc, and 70 atom percent of cadmium.

3. A process of regenerating neutron-bombarded metallic uranium fuel containing plutonium and fission products, comprising introducing said fuel into a mixture of molten salt containing 50 mole percent of magnesium chloride, 30 mole percent of potassium chloride and 20 mole percent of sodium chloride with a molten cadmium-magnesium-zinc alloy consisting of from 0 to 63 atom percent of cadmium, from 37 to 87 atom percent of magnesium and from 0 to 32 atom percent of zinc at a temperature of about 600° C.; separating an alloy phase containing precipitated uranium metal and dissolved plutonium metal from a salt phase containing fission-product values; removing said uranium metal from said alloy phase; and heating said alloy phase for volatilization of cadmium, zinc and magnesium away from plutonium.

4. The process of claim 3 wherein the alloy consists of 20 atom percent of cadmium and 80 atom percent of magnesium.

References Cited by the Examiner

UNITED STATES PATENTS

| | | | |
|---|---|---|---|
| 2,914,399 | 11/1959 | Dwyer et al. | 75—84.1 |
| 3,120,435 | 2/1964 | Chiotti | 75—84.1 |
| 3,154,408 | 10/1964 | Knighton et al. | 75—84.1 |

REUBEN EPSTEIN, *Primary Examiner.*

CARL D. QUARFORTH, *Examiner.*